Jan. 17, 1928.
H. H. LUEDINGHAUS
1,656,211
SUBWAY CABLE RACK
Filed April 8, 1926
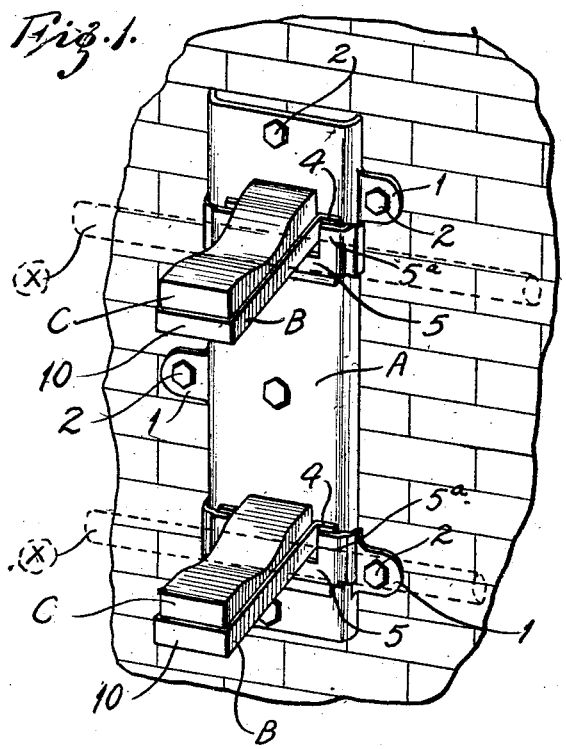
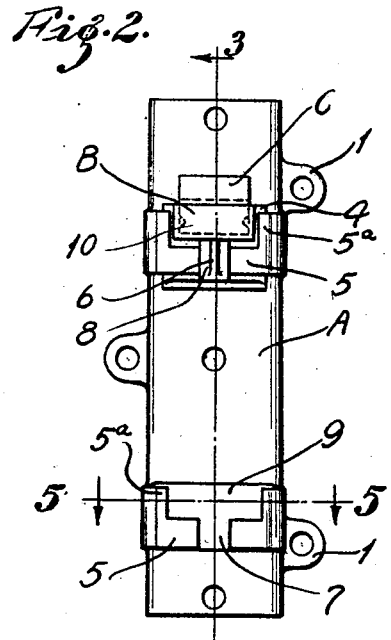
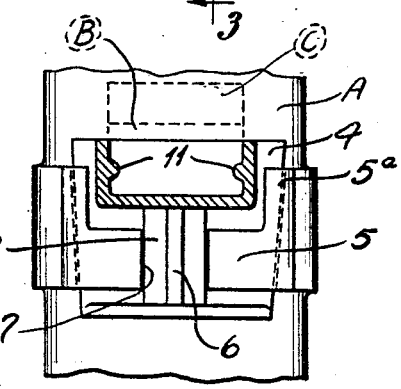
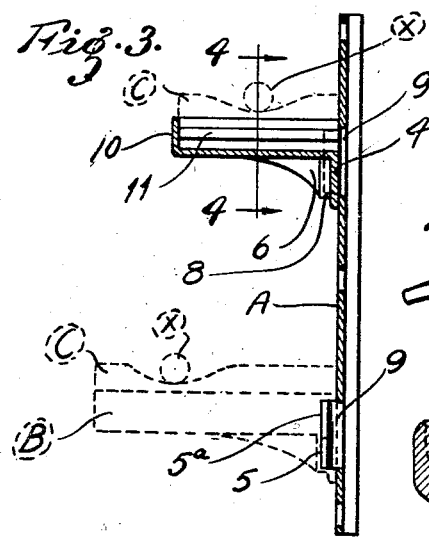
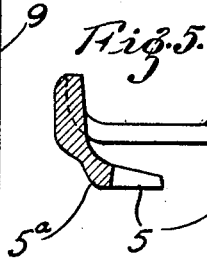
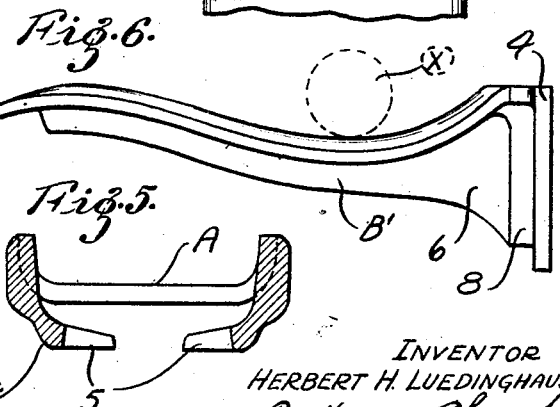
INVENTOR
HERBERT H. LUEDINGHAUS
By Bakewell & Church
ATTORNEYS Patented Jan. 17, 1928.

1,656,211

UNITED STATES PATENT OFFICE.

HERBERT H. LUEDINGHAUS, OF ST. LOUIS, MISSOURI, ASSIGNOR TO ST. LOUIS MALLE-ABLE CASTINGS COMPANY, OF ST. LOUIS, MISSOURI, A CORPORATION OF MISSOURI.

SUBWAY-CABLE RACK.

Application filed April 8, 1926. Serial No. 100,571.

This invention relates to electrical conductor supporting devices of the kind that are known commercially as subway cable racks.

The object of the invention is to provide a subway cable rack of exceptionally rugged construction, that is inexpensive to manufacture and of such design that the cable arms are held rigidly on the supporting member of the rack and combined with said supporting member in such a manner that they can be quickly connected to or removed from said supporting member.

Figure 1 of the drawings is a perspective view, illustrating my improved subway rack arranged in operative position.

Figure 2 is a front elevational view of said rack, with one of the cable arms removed from the supporting member.

Figure 3 is a vertical longitudinal sectional view, taken on the line 3—3 of Figure 2.

Figure 4 is a vertical sectional view, taken on the line 4—4 of Figure 3.

Figure 5 is an enlarged horizontal sectional view, taken on the line 5—5 of Figure 2; and Figure 6 is a side elevational view of a cable arm that can be used in instances where it is not necessary or desirable to support the cables on insulators.

Referring to the drawings which illustrate the preferred form of the invention, A designates the supporting member of the rack which preferably consists of a channel-shaped casting whose side legs have integral, laterally-projecting lugs provided with holes for receiving fastening devices 2 that are used to connect the supporting member to a wall or other supporting structure. If desired, the web of the supporting member A can be provided with similar holes for receiving fastening devices. Projecting forwardly from the front side of the supporting member A are one or more cable arms B which are combined with said supporting member in such a manner that they will be held rigidly at substantially right angles to same, but are capable of being quickly connected to or disconnected from said supporting member. The cable arms B may be of the form shown in Figure 1, wherein each cable arm is provided with one or more insulators C concaved on its top face so as to form a seat for a cable $x$, or they may be of the form shown in Figure 6, wherein the top surface of the cable arm B' is concaved, so as to form a seat for a cable $x$.

One novel feature of my improved cable rack consists in the means that is used to detachably connect the cable arms to the supporting member A. Said means consists of an integral pocket on the front side of the supporting member for each of the cable arms, and a head piece at the inner end of each cable arm that fits snugly in its co-operating pocket on the supporting member, said pocket and head piece having co-operating surfaces of sufficient area to prevent the cable arm from twisting or moving in any direction other than upwardly.

While the shape of the pockets on the supporting member A and the head pieces on the cable arms can be changed in various ways without departing from the spirit of my invention, I prefer to provide each cable arm at its inner end with a vertically-disposed head piece 4 of slightly greater width than the cable arm and having its longitudinal edges slightly inclined so as to form a substantially wedge-shaped member provided with relatively wide front and rear faces. The rear faces of the head pieces 4 on the cable arms are adapted to bear against the front side of the web of the supporting member A, and the pockets on said supporting member which receive said head pieces are integrally connected to the supporting member and are provided with tapered sides that bear snugly against the tapered edges of the head pieces on the cable arms. As shown in the drawing, each of said pockets has a front wall 5 arranged transversely of the web of the supporting member A and spaced far enough away from the front face of said web to bear snugly against the front side of the head piece 4 that is positioned in said pocket. In order that the pockets on the supporting member A and the co-operating head pieces 4 on the cable arms will have coacting surfaces of relatively great area, the side portions of said pockets that embrace the edge portions of the head pieces on the cable arms are extended upwardly at 5ª above the front walls 5 of said pockets, as shown in Figure 4, and the head pieces on the cable arms are made of slightly greater depth than the pockets on the supporting member so that the inner faces of said head pieces will bear against the supporting member at points above and below the top and bottom edges of said pockets.

The cable arms are disposed at substantially right angles to the head pieces 4 at the inner ends of said arms, and in order to reinforce and strengthen said arms, each arm is provided with a gusset or brace 6 integrally connected to the underside of the arm and to the front side of the head piece 4 on the arm. The front walls 5 of the pockets on the supporting member A are provided with slots 7 through which the braces 6 on the cable arms project forwardly, and if desired, the brace or gusset 6 of each cable arm can be integrally connected at its inner end to a wide rib 8 on the front side of the head piece of the arm which is proportioned so that it will fit in the slot 7 in the front wall of the pocket in which said head piece is arranged. In order to reduce the weight of the supporting member A and facilitate the operation of casting said member, the web of said member is provided with holes 9 at points where the pockets on said member are located, the height of said holes 9 being less than the depth of the head pieces 4 on the cable arms, so that said head pieces will bridge said holes, and thus have a bearing on the supporting member at points above and below the top and bottom edges of said holes. It is immaterial how the insulators C are combined with the cable arms, but one convenient way of constructing the cable arms, when they are intended to be equipped with insulators, is to form each cable arm from a substantially channel-shaped casting open at its inner end and having its front end closed by an end wall 10 that laps over the front end of the insulator C, and thus prevents the insulator from moving forwardly away from the supporting member A, the insulator being provided in its side edges with grooves that are adapted to receive ribs 11 on the inner sides of the side flanges of the cable arm, as shown in Figure 4. When the cable arm is detached from the supporting member A, the insulator or insulators on said arm can be removed easily from same by sliding them longitudinally of the arm through the opening at the rear end of same, and when the arm is in operative position on the supporting member, the insulator is retained securely in operative position, even though it becomes cracked. It will, of course, be understood that the cable arms may be of any desired length, and that each arm may be provided with one or more insulators C. The cable arm B' shown in Figure 6 is provided at its inner end with a head piece 4, a rib 8 and a gusset or brace 6 of the kind previously described, but said arm has no provision for supporting an insulator.

A subway cable rack of the construction above described is inexpensive to manufacture; it is of such design that the cable arms can be easily combined with or disconnected from the supporting member of the rack, and when said cable arms are arranged in operative position on said supporting member, they are effectively held against twisting movement, sidewise movement and downward movement.

Having thus described my invention, what I claim as new and desire to secure by Letters Patent is:

1. A subway cable rack, comprising a substantially channel-shaped supporting member provided with integral, laterally-projecting lugs having holes in same for receiving fastening devices, an integral pocket on the front side of said supporting member having a slotted front wall spaced away from the front side of the web of said supporting member, a cable arm projecting forwardly from said supporting member and provided with flanges that are adapted to embrace an insulator, and a head piece at the inner end of said cable arm removably mounted in said pocket and provided with a brace or gusset that projects forwardly through the slot in the front wall of said pocket.

2. A subway cable rack composed of a supporting member provided on its front side with a pocket comprising a front wall arranged in opposed relation to the front side of said supporting member, and side walls of greater height than the depth of said front wall, a removable cable arm projecting forwardly from said supporting member over the top edge of the front wall of said pocket, and a head piece at the inner end of said arm of greater length than the depth of the front wall of said pocket, arranged in engagement with the inner side of said wall and the front face of the supporting member and provided with side edges that bear against the side walls of said pocket.

HERBERT H. LUEDINGHAUS.